United States Patent

[11] 3,633,774

| [72] | Inventor | William S. Lee<br>760 South Jefferson Davis Parkway, New Orleans, La. 70119 |
|---|---|---|
| [21] | Appl. No. | 9,223 |
| [22] | Filed | Feb. 6, 1970 |
| [45] | Patented | Jan. 11, 1972 |

[54] MOVING METHOD
17 Claims, 10 Drawing Figs.

[52] U.S. Cl. .................................................. 214/152,
214/38 CC, 254/131, 280/46, 280/47.13, 280/79.1
[51] Int. Cl. .................................................. B65g 67/02
[50] Field of Search .......................................... 214/38,
372, 38.40, 38.46, 152; 280/46, 47.13, 79.1; 254/8 R, 8 C, 131

[56] References Cited
UNITED STATES PATENTS

| 2,932,527 | 4/1960 | Payne ........................... | 214/38 C X |
| 1,081,093 | 12/1913 | Chapman et al. ............... | 280/46 |
| 3,512,663 | 5/1970 | Guerrico ....................... | 214/372 X |

*Primary Examiner*—Robert G. Sheridan
*Attorney*—C. Emmett Pugh

ABSTRACT: A heavy-duty moving system including a sled, two sets of removable heavy-duty caster wheels (FIG. 1) and a lever arm assembly (FIG. 1A) for moving heavy equipment, for example, the "XEROX" copy machines of the 2400 series. The sled is slid under the machine (FIG. 3) and then raised at one end by the lever assembly (FIG. 4), one set of caster wheels then being laterally inserted and locked into the sled (FIG. 5). The opposite end of the sled is raised and the second set of caster wheels inserted and locked into the sled (FIG. 6). Upon lowering, the equipment is then ready for transportation (FIG. 7).

INVENTOR.
WILLIAM S. LEE

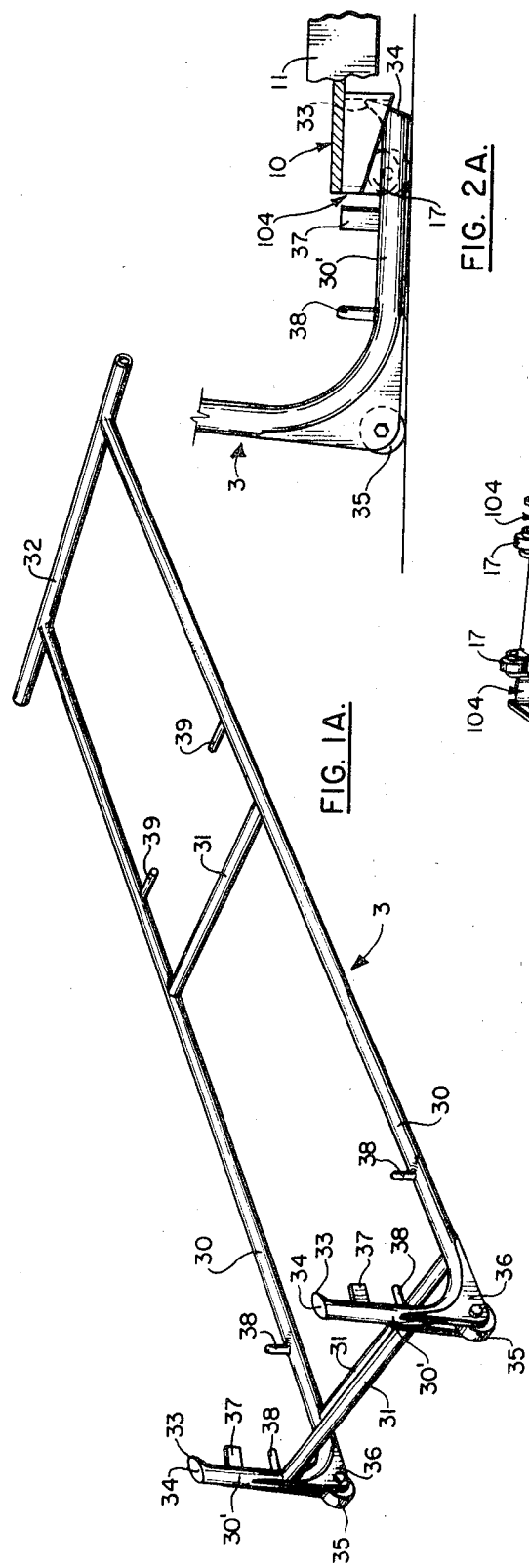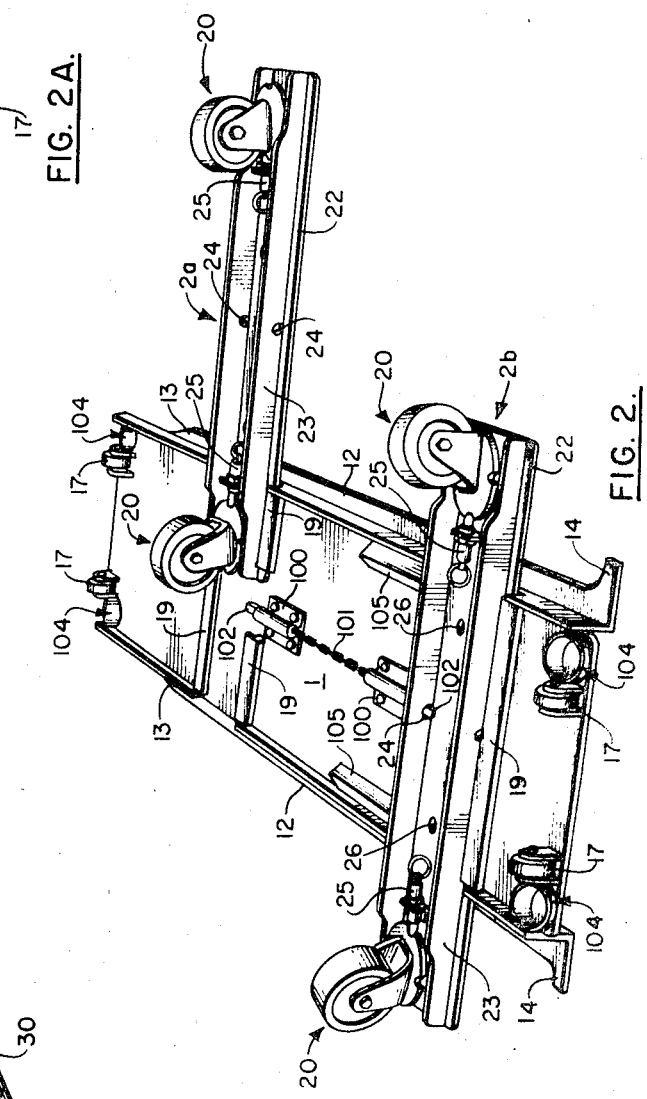

INVENTOR.
WILLIAM S. LEE
BY C. Emmett Pugh
ATTORNEY

INVENTOR.
WILLIAM S LEE
BY C. Emmett Pugh
ATTORNEY

MOVING METHOD

BACKGROUND OF THE INVENTION

The present invention relates to a multielement moving system for transporting heavy equipment. Heretofore various systems have been devise for moving heavy equipment but all have been relatively complex, awkward, expensive, undependable, time consuming and difficult to use. It is a basic object of the present invention to overcome and solve these prior art problems.

As an example of the prior art, the present system for moving the "XEROX" copy machine of the 2400 series from one place to another consists of a bolt-on "jury-rig" comprising a set of several angle iron brackets with removable wheels and required the removal of the machine's skirts and convenience casters and the use of a jack. Using this prior art system it would often take two men almost an hour to prepare the machine for moving and about the same time to disengage the moving gear and replace the machine parts. By contrast the system of the present invention reduces the time of preparation and disengagement to approximately a minute or two, can be performed by only one person and does not require the removal of the skirts or convenience casters or the bolting or unbolting of any gear with the machine.

Additional advantages over the prior art include greater protection to the delicate undersides of the machine, a wider and safer moving caster stance, a superior lengthwise placement of moving casters which facilitates the moving of the machine over uneven surfaces, and permits the handling of the machine with a fork lift. The present system also facilitates the crating or uncrating of the machine with or without the assistance of a lift machine.

Although many others have attempted to solve the problems of the prior art, none have disclosed a system as efficacious as the present invention.

BRIEF DESCRIPTION OF THE DRAWINGS

FIG. 1A is a perspective view of the lever arm assembly that along with the elements of FIG. 1 make up the multielement system of the present invention;

FIG. 2 is a bottom, perspective view of the sled with one caster set completely inserted and the other only partially inserted;

FIG. 2A is a side, plan view of the lower portion of the lever arm assembly showing its mating with the end of the sled, the latter being partially cut away and partially in section;

DETAILED DESCRIPTION OF THE PREFERRED EMBODIMENT

For purposes of illustration only, the moving system of the present invention is described as applied to the moving of a "XEROX" copy machine of the 2400 series but it is of course equally applicable to the moving of any heavy equipment generally.

Figure 1:
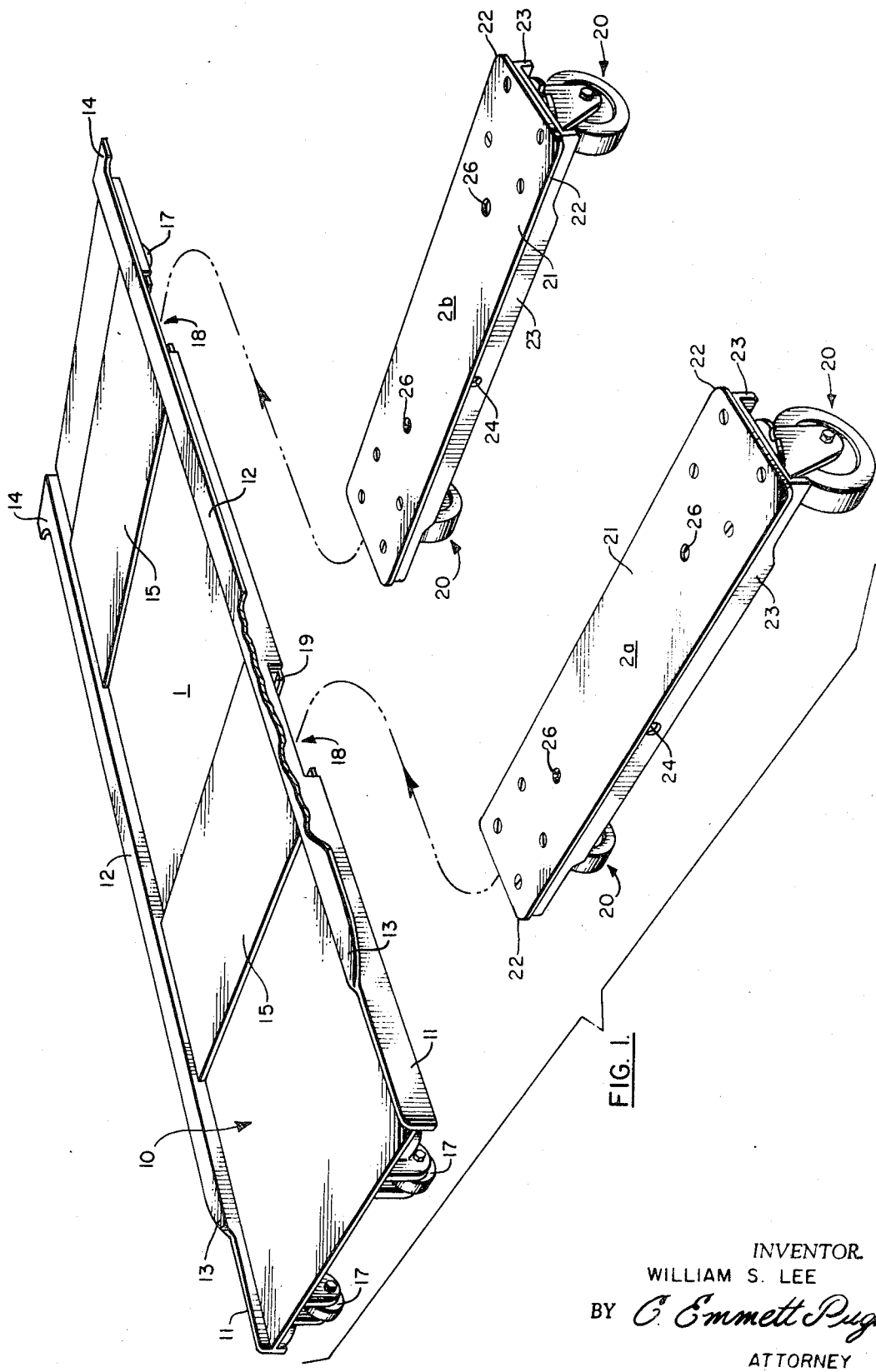
FIG. 1 is a top, perspective view of the sled and dual sets of casters with an indication of how and where the caster sets are inserted into the sled.

As best shown in FIGS. 1, 1A and 2 the multielement system of the preferred embodiment of the present invention comprises a sled 1, a dual set of caster wheels 2a and 2b, which are insertable into the sled 1, and a lever arm assembly 3 for raising the sled 1 at either end.

The sled 1, as shown in FIGS. 1 and 2, comprises a basically flatbed section 10 having vertical side plates 11 carrying load-bearing flange members 12. The load-bearing flange members 12 are gently flared at the leading edge 13 to guide and properly align the sled as it is slid under a machine and end up with projecting dogears or stops 14 to prevent the sled from sliding too far under a machine. To add greater transverse strength to the sled at the area where the caster sets are inserted, transverse plates 15 are added. Appropriate sled wheels 17 (four in number) are provided for ease in sliding the sled 1 under a machine.

The dual or twin sets 2a and 2b of casters each include two caster wheel units 20 suspended from a flat plate 21 having lateral flanges 22 and vertical sides 23. Holes 24 are provided in the center of the vertical sides 23 for locking the caster sets into the sled 1. As shown in FIG. 2, standard adjusting elements 25 are included with the casters which lock the casters 20 in a particular alignment or allow them to freely swivel, as desired.

As indicated by the broken arrows in FIG. 1 and shown in FIG. 2, the caster sets 2a and 2b are inserted into the channels 18 and 18' of the sled 1 formed by "L"-shaped brackets 19. The brackets mate with the flanges 22 and guide and hold the caster sets 2a and 2b as they are inserted or removed. The channel 18 is placed closer to the longitudinal center of the sled 1 than the channel 18'. The caster sets 2a and 2b are locked in place by means of spring loaded locking bolts 100 which mate with the holes 24 when the caster sets 2a and 2b are centrally located. A chain 101 is provided between the two bolt elements 102 which when pulled removes the bolt elements 102 out of the holes 24 and unlocks the caster sets 2a and 2b.

The lever arm assembly 3, as shown in FIG. 1A, consists of two tubular parallel, extended "L"-members 30 joined together by means of crossbars 31 and handlebar 32. The lower leg sections 30' extend out at an angle of 90° or less from the main sections of the "L"-members 30. Wheels 35 are provided at the junction of the sections of the "L"-members 30 for ease in using and transporting the elements of the system. Wheel mounts for the wheels 35 are flared out to provide stair gliders 36 which provide a smoother action or ride when the lever arm assembly 3 is rolled up and pulled up stairs and the like. A tip or boot 33 is provided on the end 34 of the lower leg section 30' of the "L"-members 30 to assist in its mating with the cylindrical beveled sockets 104. The tip 33 extends out and away from the plane of the end 34 so that it bears the weight of the sled and machine 40 when it is in the position shown in FIGS. 5 and 6.

As best shown in FIG. 2A, when the lever arm 3 is used to raise or lower the sled 1, the lower sections 30' are inserted under the sled body and, because of the bevel of the sockets 104, clear the front part of each socket but the ends 34 thereof contact the rear part. The socket configuration thus serves to guide the lower sections 30' into the sockets 104.

The moving system of the present invention is used to move the "XEROX" 2400 machine 40 in the following manner (note FIGS. 3–7).

Figure 3:
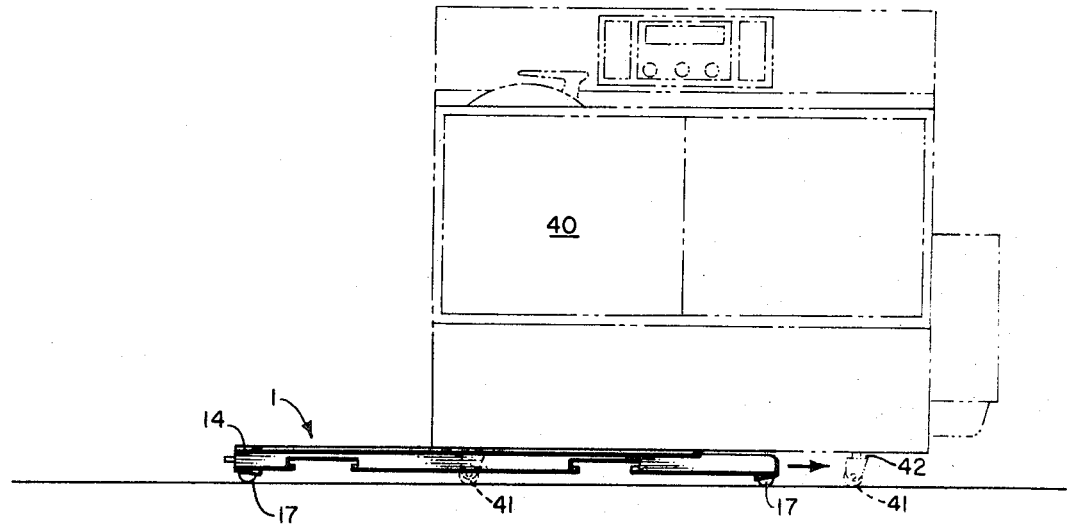
FIGS. 3–7 are side, plan views showing the steps in mounting the machine utilizing the system of the present invention.

As shown in FIG. 3, the sled 1 is slid under the machine 40 from the lighter side (left side in illustrations) of the machine 40, the small wheels 17 making it an easy matter to slide the sled 1. The machine 40 is provided at manufacture with convenience, light-duty casters 41 which can be used to move the machine a small amount but are insufficient in strength to be used for general transportation. The sled 1 is designed so that the flange 12 is high enough to clear the top of the horn 42 of each convenience caster 41 but low enough to clear the lower edge 43 of the machine skirt 44 (note FIG. 4). The width of the flange 12 is likewise designed to be just short of the distance between the stems or vertical shafts of the convenience casters 41. Thus, when the sled 1 is fully slid under the machine 40, the sled 1 is effectively locked to the machine 40 by means of its outer flange 12 lapping over part of all four convenience caster horns 42. The dog ears or stops 14 prevent the sled 1 from sliding under too far by hitting the locknuts of the stems of the two left-side convenience casters.

After the sled 1 is fully slid under the machine, the lever arm assembly 3 is inserted under the heavier side (right side in illustration) of the sled 1 and, by the action illustrated in FIG.

Figure 4:
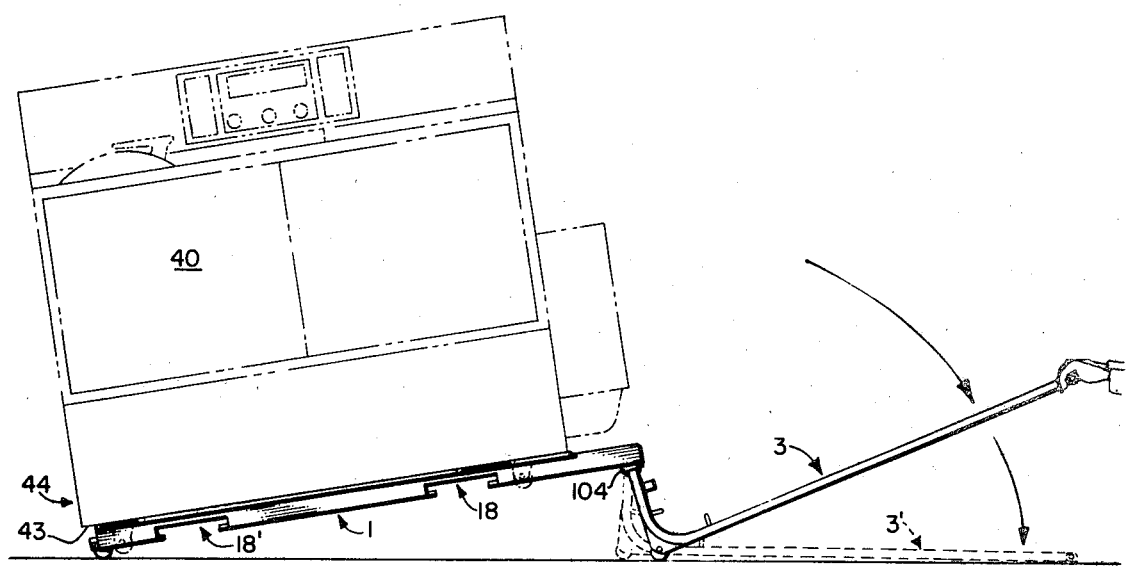

2A, mates with the sockets 104. As shown in FIG. 4, the lever arm assembly is then lowered to a horizontal position 3', thereby raising the heavier end of the machine 40. The stops 14 prevent the machine 40 from slipping off the sled 1.

Figure 5:
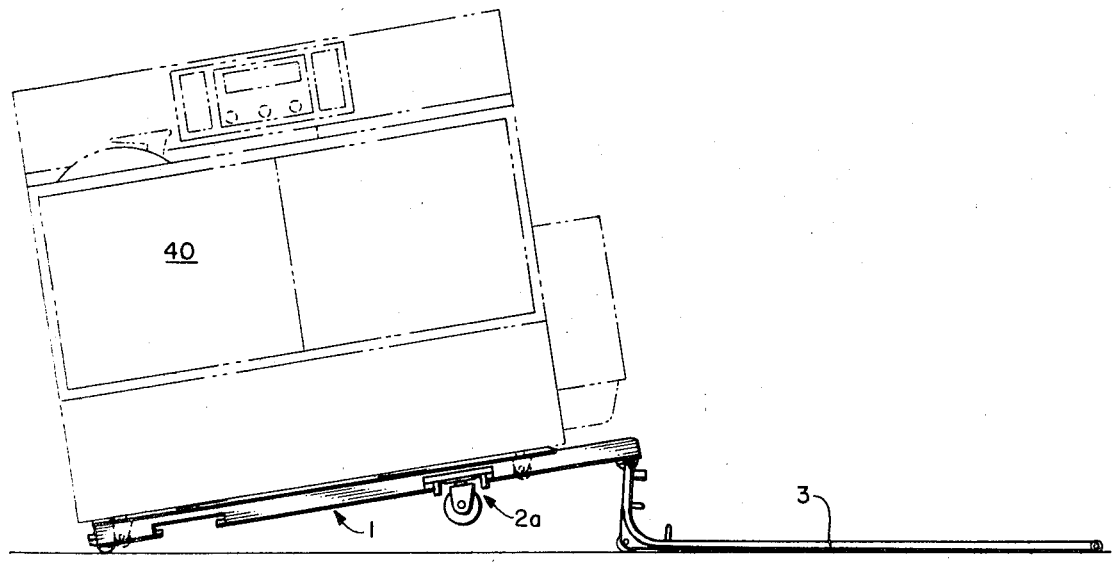
Figure 6:
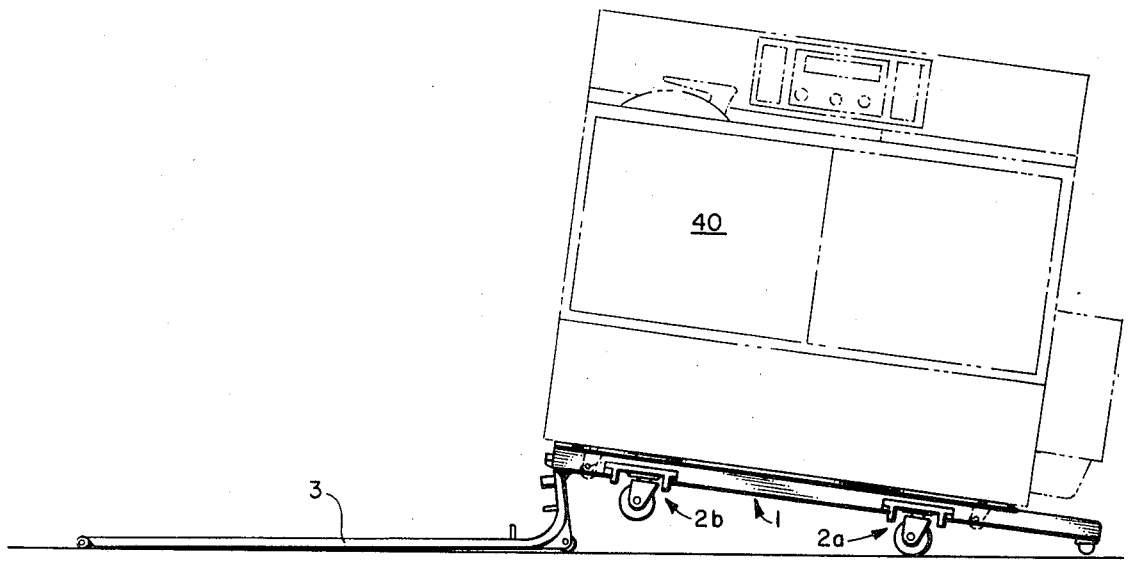
Figure 7:
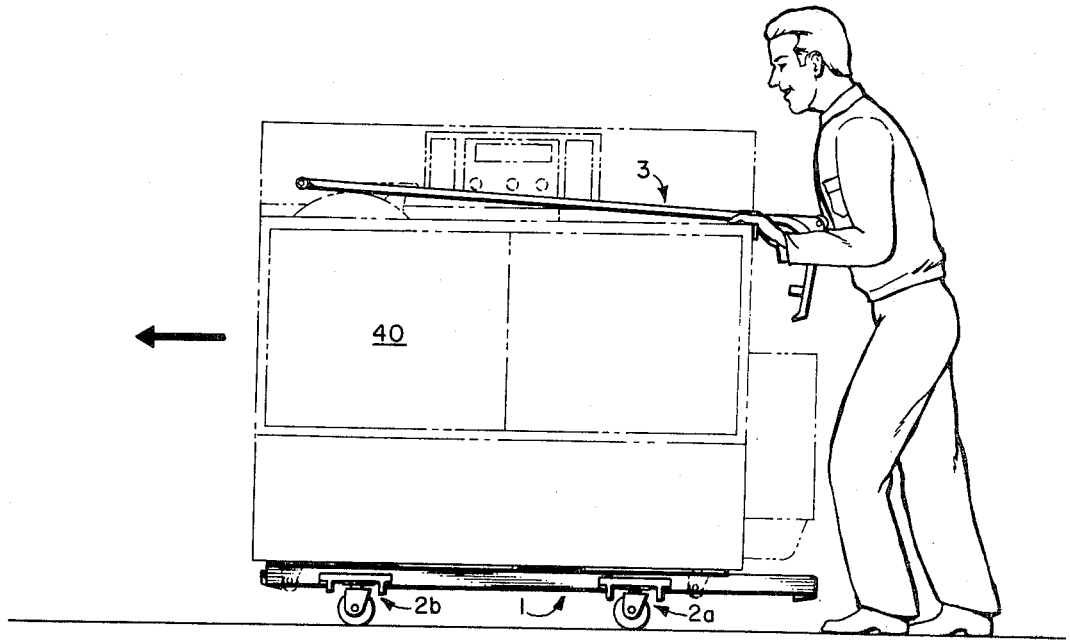

Because of the 90° or less angular relationship between the projecting leg 30' and the main body of the lever arm assembly 3 and the projecting and angularity of tip 33, the machine 40 will remain in its raised position (note FIG. 5). The caster set 2a is then slid into its chamber 18. The spring-loaded bolt 100 automatically locks the caster set 2a in its place when it reaches its center location. The lever arm assembly 3 is then raised and removed and the machine 40 thereby lowered. The lever arm assembly 3 is then brought to the opposite end of the sled 1 and inserted in the sockets 104 in the same manner as described with respect to FIG. 5. By the same action, the machine 40 is again raised, as shown in FIG. 6, and caster set 26 inserted and locked in place. Upon lowering the sled 1, the machine 40 then rides on the caster sets 2a and 2b and is ready for transportation, as shown in FIG. 7. For ease in transportation the lever arm assembly 3 can be placed on top of the machine 40 (note FIG. 7).

To facilitate movement of the machine 40 riding on the caster sets 2a and 2b, the machine 40 is best pushed from it heavier side as indicated in FIG. 7. Because of the weight distribution of the machine 40 and the placement of caster set 2a further toward the longitudinal center of the sled 1 and the machine 40, the light end of the machine 40 can be relatively easily kicked up by pressing down on the heavy end to thereby clear any obstruction. For particularly difficult obstructions, the lever arm assembly 3 can be taken from its convenient position on top of the machine 40, placed in the sockets 104 at the end near the obstruction and the machine 40 raised up and over the obstruction. The placement of the wheels 35 on the lever arm assembly 3 assists in moving the machine 40 over the obstruction. Additionally the wider stance (greater width between the caster wheels 20 than between the convenience casters 41) of the caster sets 2a and 2b provides for greater ease and safety in transporting the machine 40.

It is also noted that the sled 1 exerts no pressure on the delicate underside of the machine 40, indeed does not even touch the delicate portions, the only contact of the sled 1 being the flange 12 bearing on the 4 feet onto which the convenience casters 41 bolt.

Figure 8:
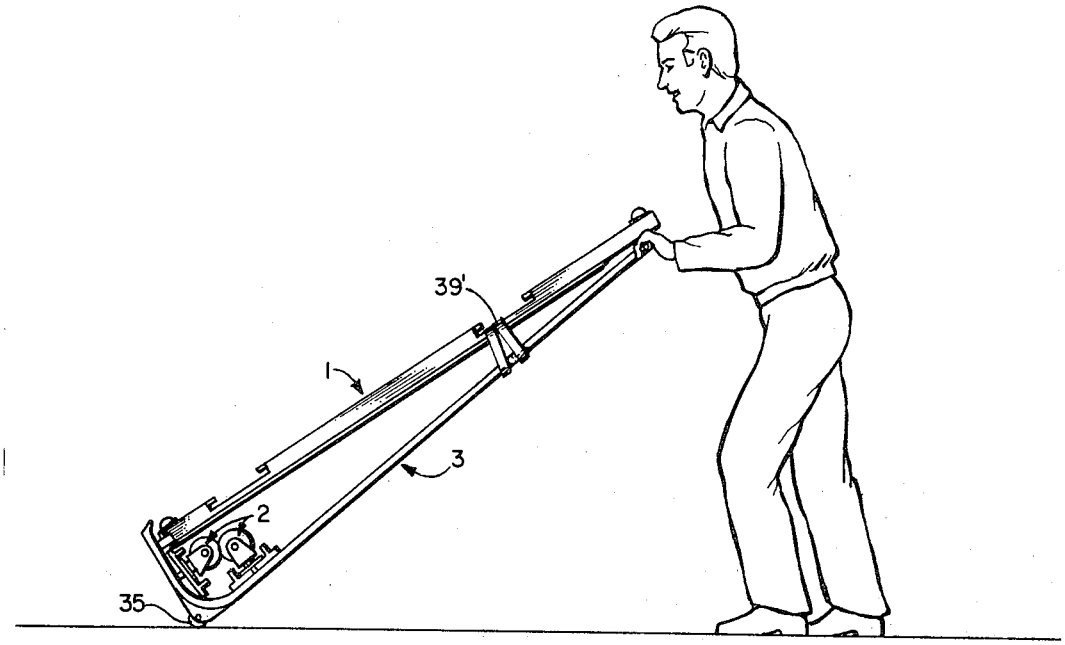
FIG. 8 is a side, plan view of the multielements of the present system being nested together for ease in transportation.

In bringing the elements 1–3 of the system to or from a job site, the sled 1 can be placed upside down on the lever arm assembly 3 and the caster set 2 placed on the sled 1 in nested fashion as shown in FIG. 8. The nested elements 1–3 can then be easily moved about by means of the wheel 35 on the assembly 3.

To insure that the nested elements remain in place on the assembly 3, tab projections 37 are provided on legs 30' to hold the sled 1 in place. Likewise, the main legs of the assembly 3 have two inwardly projecting prongs 39 for hooking a rubber band 34' or the like to the assembly 3 about the sled 1 to hold the top of the sled 1 under tension against the assembly 3. Additionally four rounded studs 38 are provided on the assembly 3 to mate with holes 26 on the wheel assemblies 2 to hold the latter in place.

A fork lift truck can likewise be used with the moving system of the present invention. To insure that the fork times do not damage the spring bolt lock 100 near caster set 26, V-shaped members 105 are fastened to the bottom of the sled 1. Only one set of the members 105 is needed because the other tine of the fork will contact the sled bottom between channel 18 and the wheels 17.

Nearly unlimited variations, alterations and changes in the design and detail of the preferred embodiment are possible within the scope of the invention. For example, rather than the closed-end, beveled sockets 104, slots in the bed 10 of the sled 1 could be used. In some applications it may be possible to use only one set of removable caster wheels, as for example when a piece of equipment is particularly high at one end and the sled would have one set of caster wheels 2 permanently built into the sled 1. Additionally, the wheels 35 could be deleted from the assembly 3 and the lever arm assembly 3 simply rotated about and on its curved heel. Moreover, rather than having the leg 30' have an angle of 90° or less, a spring loaded rod could be built into the assembly 3 and extended on down through and out the assembly 3 to maintain it in its horizontal position as long as desirable. Additional means for locking the machine 40 on the sled 1 to prevent any sliding could be provided, for example, holes in the sled body for mating with protrusions on the underside of the machine such as bolt heads and so forth. Also to insure the proper distribution of the weight of a machine and the system on a fork lift truck and prevent any lateral movement, appropriate brackets or slots in the side members 11 can be provided to positively mate with the fork tines. To provide a "universal" system for use with various sizes and configurations of machines or other equipment, the sled 1 and the caster sets 2 could be made adjustable in length and width.

Having described the preferred embodiment of the invention and indicating a few of the many possible variations, what is claimed to be invention is:

1. A method of providing a heavy load having a substantial portion of its bottom area offset from the surface on which it rests with means for easy locomotion comprising the following steps:
    a. providing an extended base member and at least one wheeled carriage member structurally separate and apart from said base member;
    b. moving only said extended base member under the heavy load at the offset portion;
    c. jacking up one part of said base member until the heavy load rests at least in part on said base member; and
    d. inserting said carriage member under said base member and placing said carriage member and said base member in juxtaposition so that said base member will rest on said carriage member when said part of said base member is unjacked.

2. The method of claim 1 wherein there is further included after step "d" the steps of:
    e. jacking up a second part of said base member until the heavy load rests at least in part on said second part of said base member;
    f. inserting at least a second carriage member under said base member and placing said second carriage member and said second part of said base member in juxtaposition so that said base member will rest on said second carriage member when said second part of said base member is unjacked; and
    g. unjacking said parts of said base member after the carriage members have been inserted; whereby the heavy load through said base member now rides on said carriage members.

3. The method of claim 2 wherein in steps "d" and "f" there is further included the step of locking said carriage means to said base member.

4. The method of claim 2 wherein in step "b" the base member is moved under the heavy equipment by means of a sliding action.

5. The method of claim 2 wherein in steps "c" and "e" said parts of said base member are jacked up by means of a lever arm of the first order.

6. The method of claim 1 wherein said base member includes a channel for receiving said carriage member, said carriage member being inserted under said base member by sliding said carriage member into said channel.

7. The method of claim 2 wherein in steps "d" and "f" the carriage member is inserted in a direction lateral to the jacking, that is, in a direction perpendicular to the plane of the jacking direction.

8. The method of claim 7 wherein said base member is elongated and includes two lateral channels on its underside for receiving said carriage members, said carriage members being inserted under said base member by sliding said carriage members into said channels.

9. The method of claim 8 wherein said carriage means are locked into said channels.

10. The method of claim 9 wherein said locking is done automatically by spring-loaded bolts attached to said sled means fitting into holes in said carriage means.

11. The method of claim 1 wherein in step "*d*" the carriage member is inserted in a direction lateral to the jacking, that is, in a direction perpendicular to the plane of the jacking direction.

12. The method of putting heavy-duty moving equipment on a piece of heavy equipment having generally rectangularly shaped bases comprising the steps of:
   a. sliding sled means under the piece of heavy equipment so that it extends from end to end of the piece of heavy equipment;
   b. inserting a first-order lever under a first end of said sled means and raising up said sled means so that at least a part of the heavy equipment now rests on said sled means;
   c. placing laterally a set of rolling elements under said sled means at the end which is raised;
   d. inserting a first-order lever under the other end of said sled means so that the heavy equipment fully rests on said sled means;
   e. placing laterally a second set of rolling elements under said sled means at the second raised end; and
   f. lowering said sled means so that the heavy equipment and sled means are now fully carried by said sets of rolling elements.

13. The method of claim 12 wherein between steps "*c*" and "*d*" said first end is lowered so that at least part of the heavy equipment and the end of said sled means is partially carried by said first set of rolling elements, and said first-order lever arm is removed and is used to raise up the other end of said sled means.

14. The method of claim 13 wherein said sled means is provided with its own wheels and said sled means is slid under the heavy equipment by rolling it under.

15. The method of claim 14 where said sled means is provided with two lateral channel guides, said set of rolling elements being laterally placed under said sled means by inserting the rolling elements into said channel guides.

16. The method of claim 15 wherein said sets of rolling elements are locked into said channel guides when they are centrally located.

17. The method of claim 16 wherein said locking is done automatically by a spring-loaded bolt mating with a hole in each said set of rolling elements.

* * * * *